US008253266B2

(12) United States Patent
Elliott et al.

(10) Patent No.: US 8,253,266 B2
(45) Date of Patent: Aug. 28, 2012

(54) SKYSCRAPER WITH INTEGRATED WIND TURBINES

(75) Inventors: Rand Elliott, Oklahoma City, OK (US); Jamey D. Jacob, Stillwater, OK (US)

(73) Assignee: R. Elliott & Associates, Inc., Oklahoma City, OK (US)

( * ) Notice: Subject to any disclaimer, the term of this patent is extended or adjusted under 35 U.S.C. 154(b) by 151 days.

(21) Appl. No.: 12/689,925

(22) Filed: Jan. 19, 2010

(65) Prior Publication Data

US 2010/0181779 A1 Jul. 22, 2010

Related U.S. Application Data

(60) Provisional application No. 61/145,718, filed on Jan. 19, 2009.

(51) Int. Cl.
*F03D 9/00* (2006.01)
*H02P 9/04* (2006.01)

(52) U.S. Cl. .......................................... 290/55; 290/44
(58) Field of Classification Search .................. 290/44, 290/55
See application file for complete search history.

(56) References Cited

U.S. PATENT DOCUMENTS

| | | | | |
|---|---|---|---|---|
| 3,938,907 A | * | 2/1976 | Magoveny et al. | 415/141 |
| 3,986,785 A | * | 10/1976 | Ferencz | 415/186 |
| 4,004,427 A | * | 1/1977 | Butler, Jr. | 60/698 |
| 4,079,264 A | * | 3/1978 | Cohen | 290/55 |
| 4,204,805 A | * | 5/1980 | Bolie | 416/119 |
| 4,236,866 A | * | 12/1980 | Zapata Martinez | 415/4.4 |
| 4,269,563 A | * | 5/1981 | Sharak et al. | 415/186 |
| 4,365,929 A | * | 12/1982 | Retz | 415/53.1 |
| 4,534,703 A | * | 8/1985 | Flavell | 416/119 |
| 4,834,610 A | * | 5/1989 | Bond, III | 415/53.3 |
| 5,394,016 A | * | 2/1995 | Hickey | 290/55 |
| 6,041,596 A | | 3/2000 | Royer | 60/398 |
| 6,097,104 A | * | 8/2000 | Russell | 290/54 |
| 6,242,818 B1 | * | 6/2001 | Smedley | 290/44 |
| 6,749,393 B2 | | 6/2004 | Sosonkina | 415/4.1 |
| 6,765,309 B2 | | 7/2004 | Tallal, Jr. et al. | 290/55 |
| 6,841,894 B2 | * | 1/2005 | Gomez Gomar | 290/55 |
| 7,215,039 B2 | | 5/2007 | Zambrano et al. | 290/55 |
| 7,315,093 B2 | | 1/2008 | Graham, Sr. | 290/55 |
| 7,323,791 B2 | | 1/2008 | Jonsson | 290/55 |
| 7,329,965 B2 | | 2/2008 | Roberts et al. | 290/55 |
| 7,368,828 B1 | | 5/2008 | Calhoon | 290/55 |
| 7,834,477 B2 | * | 11/2010 | Sheikhrezai | 290/55 |
| 7,911,075 B2 | * | 3/2011 | Pagliasotti | 290/55 |
| 8,134,252 B2 | * | 3/2012 | Pagliasotti | 290/55 |
| 8,188,614 B2 | * | 5/2012 | Pagliasotti | 290/55 |
| 2003/0035725 A1 | * | 2/2003 | Sosonkina | 416/11 |
| 2003/0111843 A1 | * | 6/2003 | Tallal et al. | 290/55 |
| 2010/0084867 A1 | * | 4/2010 | Sato | 290/52 |
| 2010/0219635 A1 | * | 9/2010 | Evans, Jr. | 290/44 |
| 2010/0257795 A1 | * | 10/2010 | Pagliasotti | 52/173.1 |
| 2010/0295319 A1 | * | 11/2010 | Britnell | 290/55 |

(Continued)

*Primary Examiner* — Pedro J Cuevas
(74) *Attorney, Agent, or Firm* — Crowe & Dunlevy

(57) ABSTRACT

A building with an integrated wind-powered electricity generation system includes a plurality of floors, wherein each of the plurality of floors includes inhabitable space. The building further includes a plenum space between adjacent ones of the plurality of floors and a plurality of vertical axis wind turbines, wherein each of the plurality of vertical axis wind turbines is positioned within a separate plenum space. The building further includes at least one electricity generator operably coupled to the plurality of vertical axis wind turbines. At least one of the vertical axis wind turbines includes a wind screen extending around a portion of the outer circumference of the vertical axis wind turbine.

21 Claims, 8 Drawing Sheets

U.S. PATENT DOCUMENTS

| | | | |
|---|---|---|---|
| 2010/0308597 A1* | 12/2010 | Gyorgyi | 290/55 |
| 2011/0133462 A1* | 6/2011 | Pagliasotti | 290/50 |
| 2011/0133480 A1* | 6/2011 | Pagliasotti | 290/55 |
| 2011/0140450 A1* | 6/2011 | Kawas et al. | 290/55 |
| 2011/0221196 A1* | 9/2011 | Kawas et al. | 290/44 |

* cited by examiner

SKYSCRAPER WITH INTEGRATED WIND TURBINES

RELATED APPLICATIONS

The present application claims the benefit of U.S. Patent Application Ser. No. 61/145,718, filed Jan. 19, 2009, entitled "Skyscraper with Integrated Wind Turbines," the disclosure of which is herein incorporated by reference.

FIELD OF THE INVENTION

This invention relates generally to buildings and more particularly to a building with an integrated system for generating electricity from wind.

BACKGROUND OF THE INVENTION

Recent reports indicate that buildings consume more than 40 percent of the energy used in the United States. As companies pursue environmental stewardship and reduced energy costs, energy efficiency has become an important aspect of modern architectural design. Although a number of improvements have been made to building materials which can decrease a building's overall energy requirement, little progress has been made in developing buildings that are capable of on-site energy generation.

Several past attempts have been made to incorporate wind-powered electrical generation systems into buildings. For example, U.S. Pat. No. 7,215,039 issued to Zambrano et al. discloses a wind turbine system that exploits an aerodynamically enhanced wind zone of a structure by aligning a plurality of horizontal axis wind turbine generators along a wall. U.S. Pat. No. 6,041,596 issued to Royer discloses an improved building structure that incorporates a tunnel-like opening that is adapted to contain a wind-sensitive generator. U.S. Pat. No. 6,765,309 issued to Tallal, Jr. et al. discloses one or more air intakes that funnel wind into a wind generator mounted internally to the structure. Similarly, U.S. Pat. No. 7,315,093 issued to Graham, Sr. discloses the use of a cylindrical wind turbine at the edge of a building's rooftop. Despite these previous designs, there continues to be a need for buildings that are capable of generating enough energy through wind to constitute an energy-neutral structure. It is to these and other deficiencies in the prior art that the preferred embodiments of the present invention are directed.

SUMMARY OF THE INVENTION

In preferred embodiments, the present invention includes a building with an integrated wind-powered electricity generation system. In one aspect, the building includes a first floor, a second floor and a plenum space between the first floor and the second floor. The building further includes a radial turbine assembly positioned within the plenum space, wherein the radial turbine assembly is configured to rotate about a vertical axis. The radial turbine assembly drives a conventional electricity generator.

In another aspect, the present invention provides a building with an integrated wind-powered electricity generation system in which the building includes a plurality of floors, wherein each of the plurality of floors includes inhabitable space. The building further includes a plenum space between adjacent floors of the plurality of floors, and a plurality of vertical axis wind turbines. Each of the plurality of vertical axis wind turbines is positioned within a separate plenum space. In yet another aspect, at least one of the vertical axis wind turbines includes a wind screen extending around a portion of the outer circumference of the vertical axis wind turbine. The building further includes an electricity generator operably coupled to the vertical axis wind turbine.

DETAILED DESCRIPTION OF PREFERRED EMBODIMENTS

Figure 1:
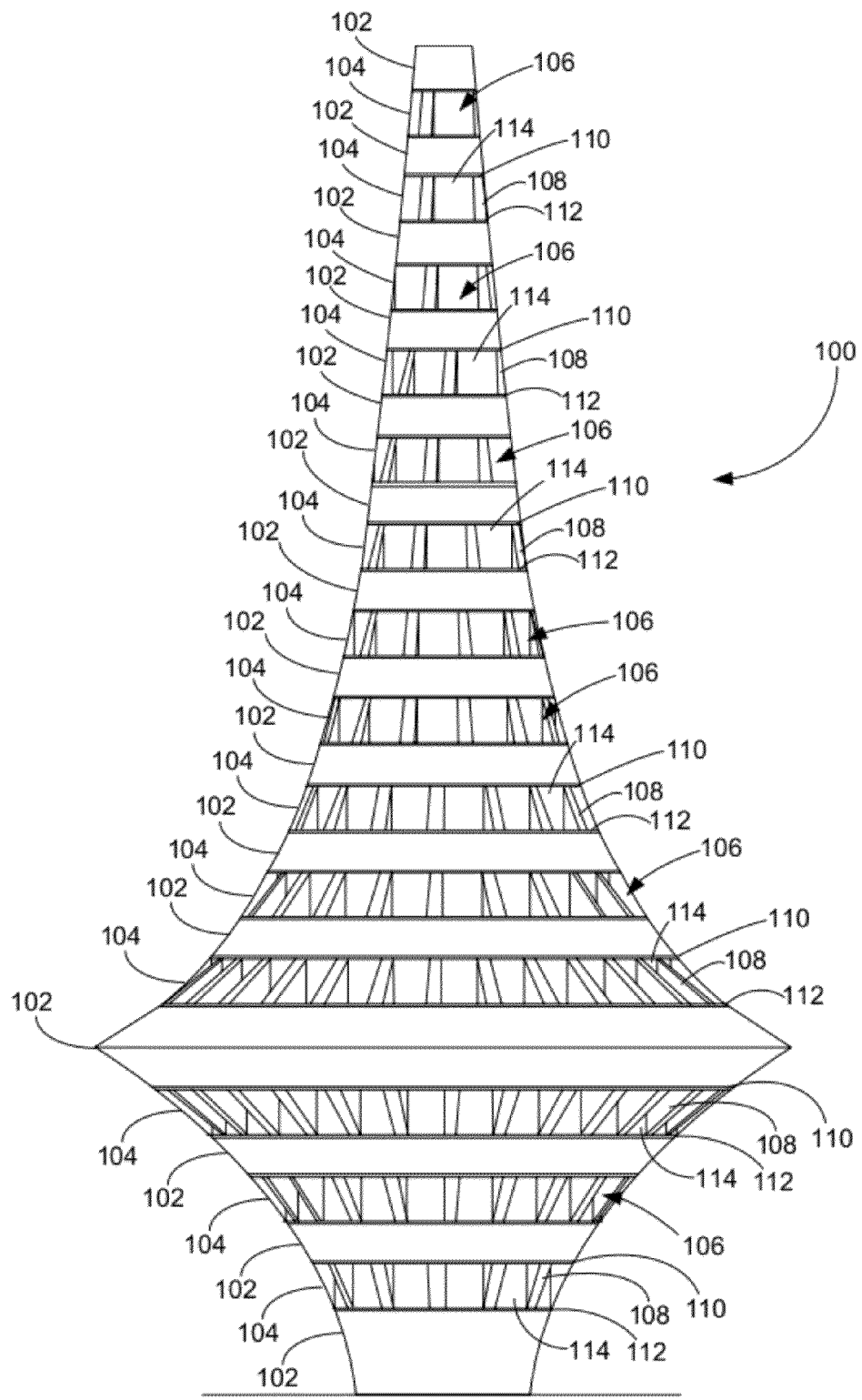
FIG. 1 is an elevational view of a building constructed in accordance with a preferred embodiment of the present invention.
Figure 2:
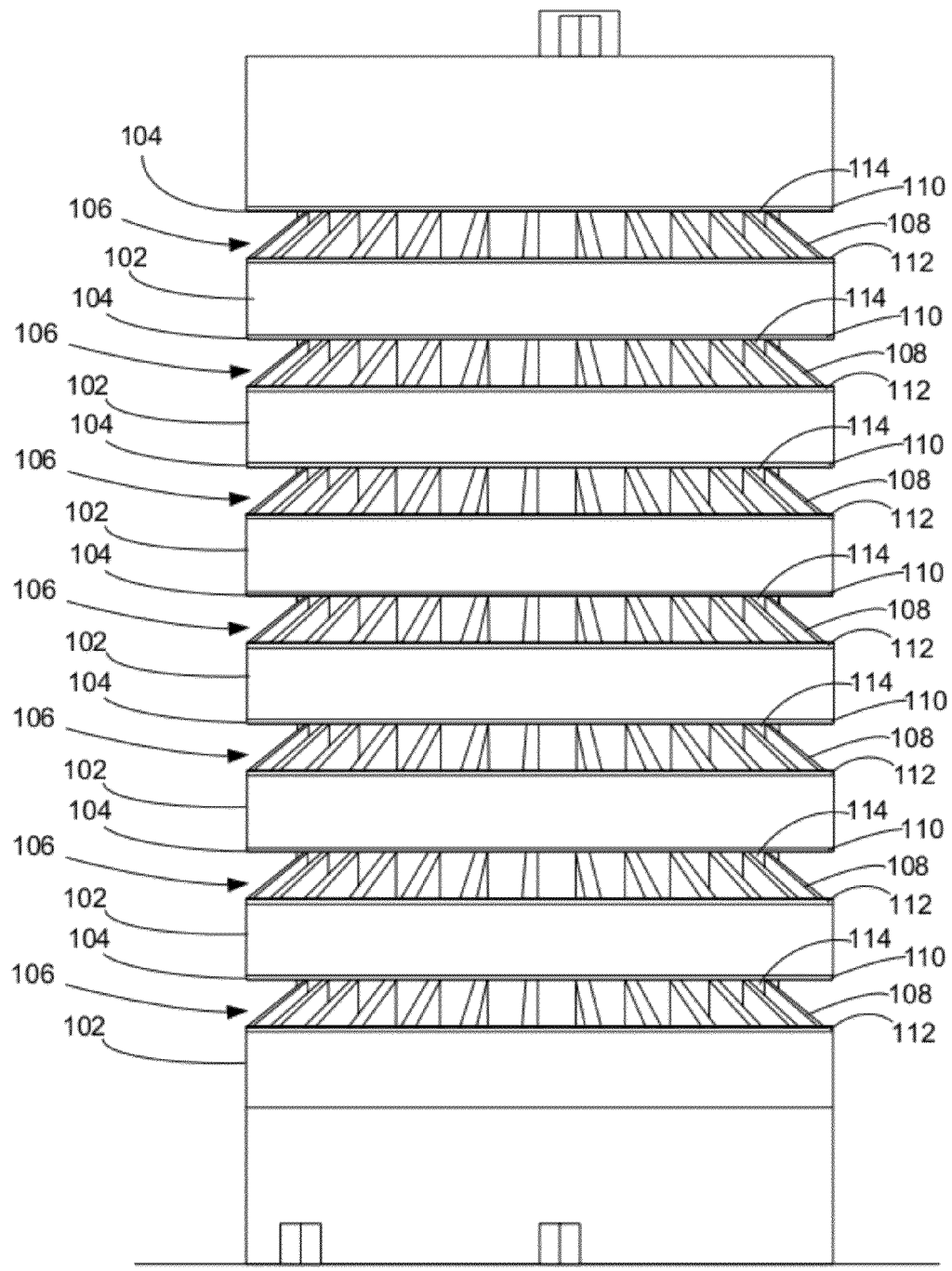
FIG. 2 is an elevational view of a building constructed in accordance with an alternate preferred embodiment of the present invention.

Turning first to FIG. 1, shown therein is front elevational view of a building 100 constructed in accordance with a preferred embodiment of the present invention. The building 100 includes a plurality of floors 102 that are separated by corresponding plenum spaces 104. Each floor 102 preferably provides inhabitable space with glass window exteriors. In the preferred embodiment shown in FIG. 1, the building 100 has a circular cross-section that varies in diameter across the height of the building 100. In the preferred embodiment, the geometry of the building 100 approximates two parabolas in vertical section revolved around a central axis to form curved cones connected at open ends. The shape of the building 100 encourages the flow of wind past the plenum spaces 104. It will be appreciated by those of skill in the art, however, that the novel aspects of the present invention will find applicability in buildings of almost any size and design. For example, FIG. 2 shows an alternate preferred embodiment in which a building 100 is substantially configured as a cylinder.

Independent of the shape of the building 100, at least one plenum space 104 includes a radial turbine assembly 106. In the preferred embodiments shown in FIGS. 1 and 2, each of the plenum spaces 104 includes a separate turbine assembly 106. The number of radial turbine assemblies 106 needed for a given building will be dependent on a number of factors, including the size and geometry of the building, environmental considerations and the design of the radial turbine assemblies 106. It will be appreciated that the present invention is not limited to a prescribed number of radial turbine assemblies 106 and in certain cases, it will not be advisable to install a radial turbine assembly 106 in every plenum space 104.

The radial turbine assembly 106 includes a plurality of vanes 108, an upper drive ring 110, a lower drive ring 112 and a hub 114. Each radial turbine assembly 106 is configured for rotational movement about a theoretical vertical axis extending through the building 100. In this way, each radial turbine assembly 106 is configured as a vertical axis wind turbine (VAWT). Heretofore, buildings that have incorporated wind-powered electricity generation facilities have been designed primarily as horizontal axis wind turbines (HAWT).

To permit the rotation of each radial turbine assembly 106, the upper and lower drive rings 110, 112 are preferably supported by bearings or bearing surfaces between the adjacent floors 102. In a particularly preferred embodiment, vanes 108, upper drive ring 110, lower drive ring 112 and hub 114 are largely constructed from lightweight carbon fiber materials, which exhibit favorable strength-to-weight characteristics.

Figure 3:
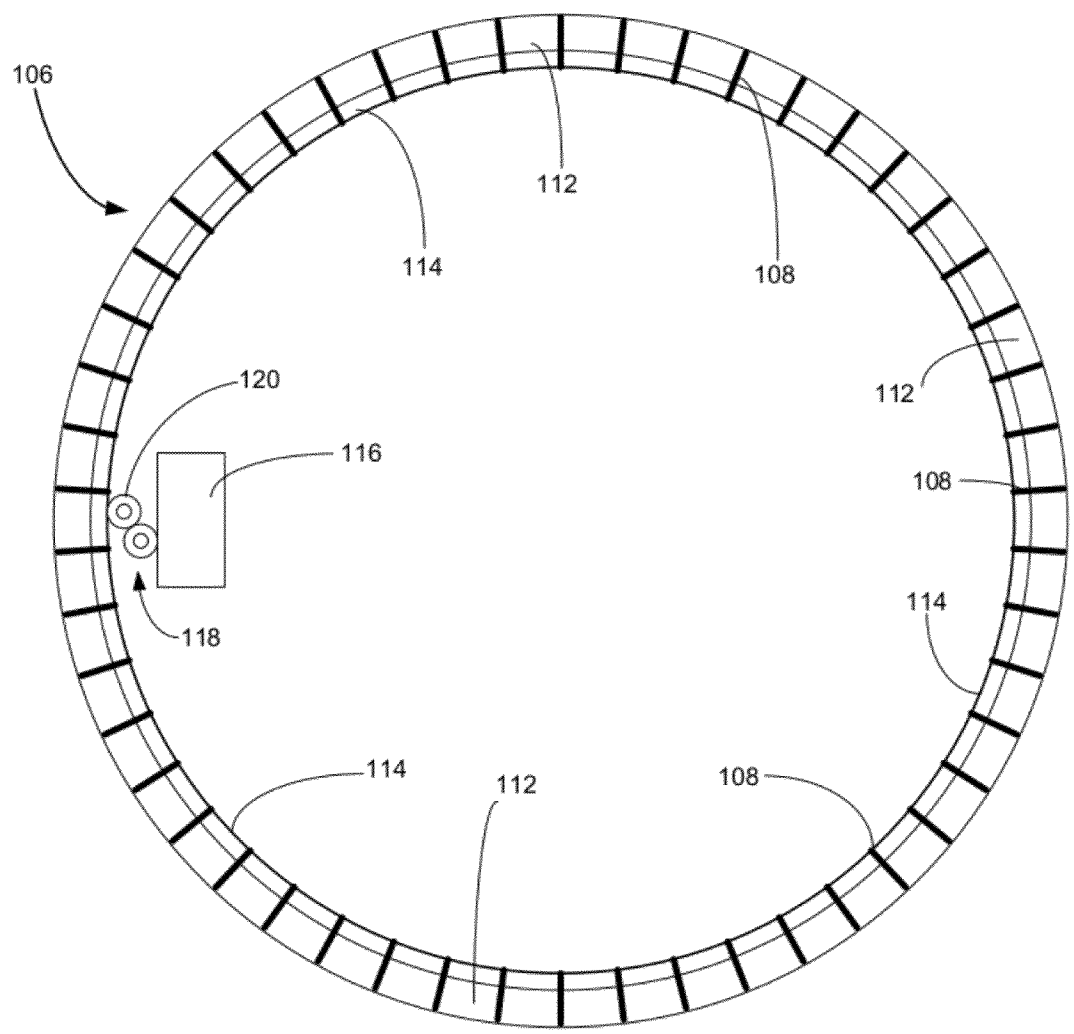
FIG. 3 is a top view of a turbine, transmission and generator constructed in accordance with a second preferred embodiment of the present invention.

Turning to FIG. 3, shown therein is a top diagrammatic depiction of a single radial turbine assembly 106 with the upper drive ring 110 removed for illustrative purposes. In the preferred embodiment, the hub 114 is connected to, and rotates with, the upper and lower drive rings 110, 112, which in turn support the vanes 108. In the preferred embodiments, the radial turbine assembly 106 does not include cross members or other structural components that extend across the diameter of the hub 114. The absence of cross members permits the use of the interstitial space between the hub 114 and the center of the building 100 for housing building resources, such as elevators, plumbing, electrical service and HVAC equipment and conduit.

The radial turbine assembly 106 is operably coupled to a generator 116 via a transmission 118. The hub 114 is connected to the transmission 118. In a particularly preferred embodiment, the interior surface of the hub 114 is provided with a series of vertically oriented splines that mate with splines on a receiving gear 120 in the transmission 118. As an alternative to a gear-driven engagement between the hub 114 and the transmission 118, the receiving gear 120 of the transmission 118 may be configured as a wheel 120 that rotates when placed into contact with the hub 114. In particularly preferred embodiments, the transmission 118 can be selectively engaged and disengaged from the hub 114 by displacing the receiving gear 120.

During operation, wind acting on the vanes 108 causes the radial turbine assembly 106 to rotate. The transmission 118 transfers the rotational movement of the hub 114 to the electrical generator 116. The generator 116 converts the mechanical energy from the radial turbine assembly 106 into electricity through well-known principles. Although not separately shown, the generator 116 may include devices for conditioning the generated electricity for use in the building 100. It will be understood that converters or conditioners may reside outside the generator 116. Furthermore, although FIG. 3 depicts a single generator 116 coupled directly to the radial turbine assembly 106, it will be recognized that the present invention is not so limited. It may be desirable in certain applications to connect a single generator 116 to multiple radial turbine assemblies 106 through common shafts or linkages extending between adjacent floors 102 and radial turbine assemblies 106.

The present invention contemplates the use of a variety of vane designs that can be selected to provide optimal performance based on environmental and other factors. Generally, the vanes 108 of presently preferred embodiments can be classified as either lift-based vanes or drag-based vanes. Exemplars of both classes are described below. As shown in FIGS. 1-3, the vanes 108 are configured as vertically-oriented paddle-style blades that operate on drag forces. This blade design is typically less efficient than complex blade designs, but the symmetrical vertical form of the vanes 108 permits the rotation of the radial turbine assembly 106 in both directions.

Figure 4:
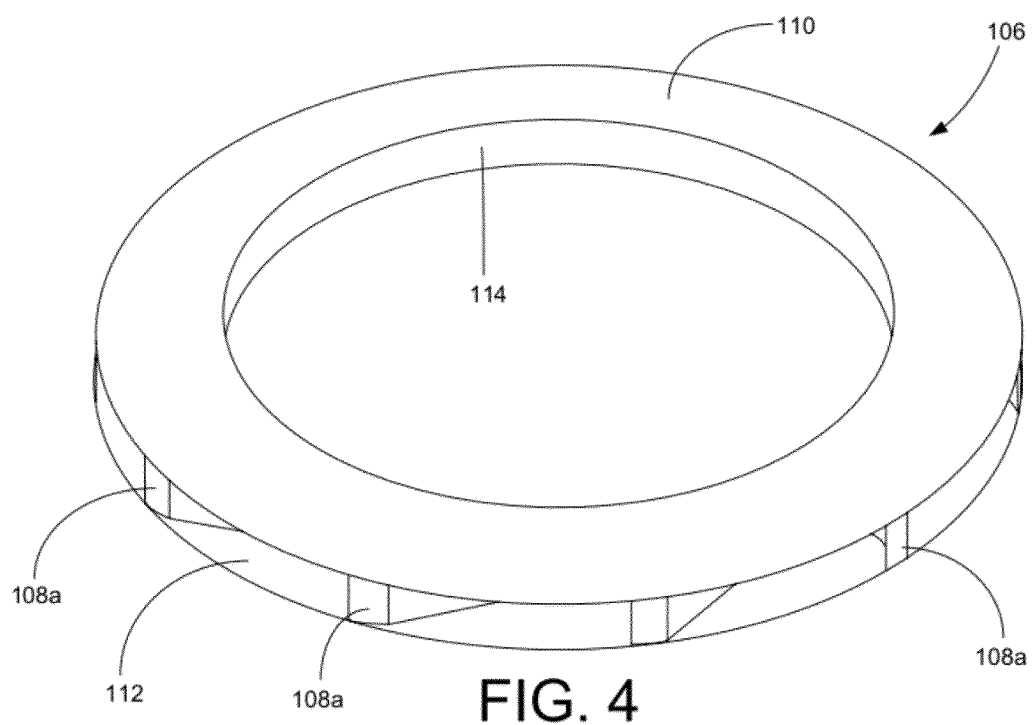
FIG. 4 is a perspective view of a turbine assembly constructed in accordance with a second preferred embodiment.
Figure 5:
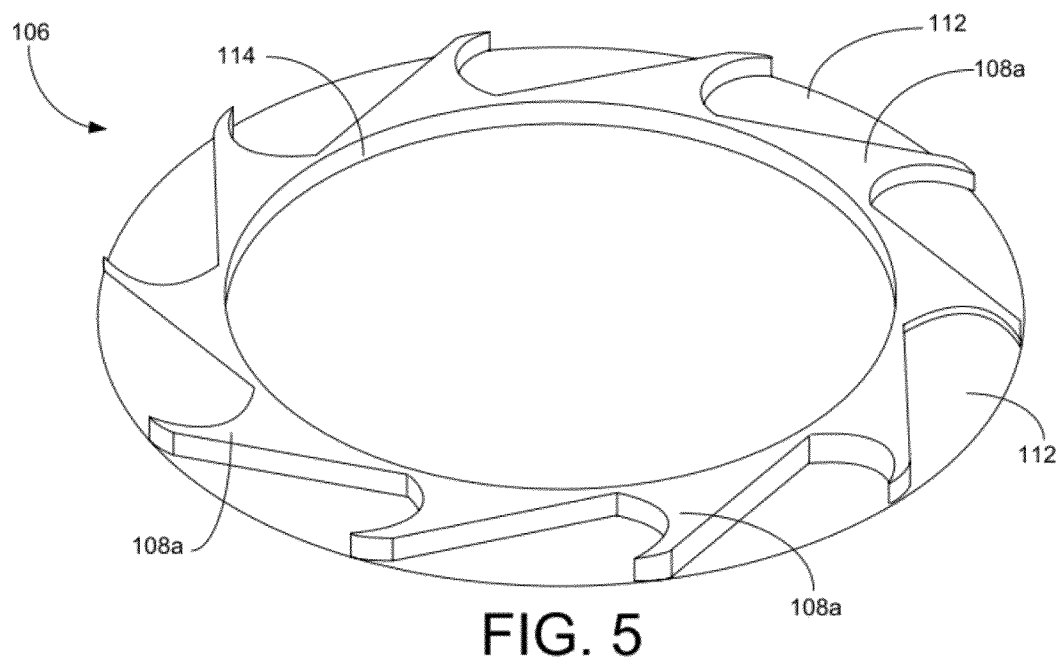
FIG. 5 is a perspective view of a turbine assembly of FIG. 4 with the upper drive ring removed.

Turning to FIGS. 4 and 5, shown therein is a depiction of the radial turbine assembly 106 constructed in accordance with a second preferred embodiment. The upper drive ring 110 has been removed in FIG. 5 to better illustrate the design of the vanes 108. In the second preferred embodiment, the vanes 108a in the radial turbine assembly 106 are configured to operate on a drag principle. Each vane 108a has a circular section similar to Savonius rotor blades or Pelton wheel blades. Although ten vanes 108a are depicted in the radial turbine assembly 106 illustrated in FIGS. 4-5, it will be appreciated that fewer or greater numbers of vanes 108a are contemplated within the scope of preferred embodiments.

Figure 6:
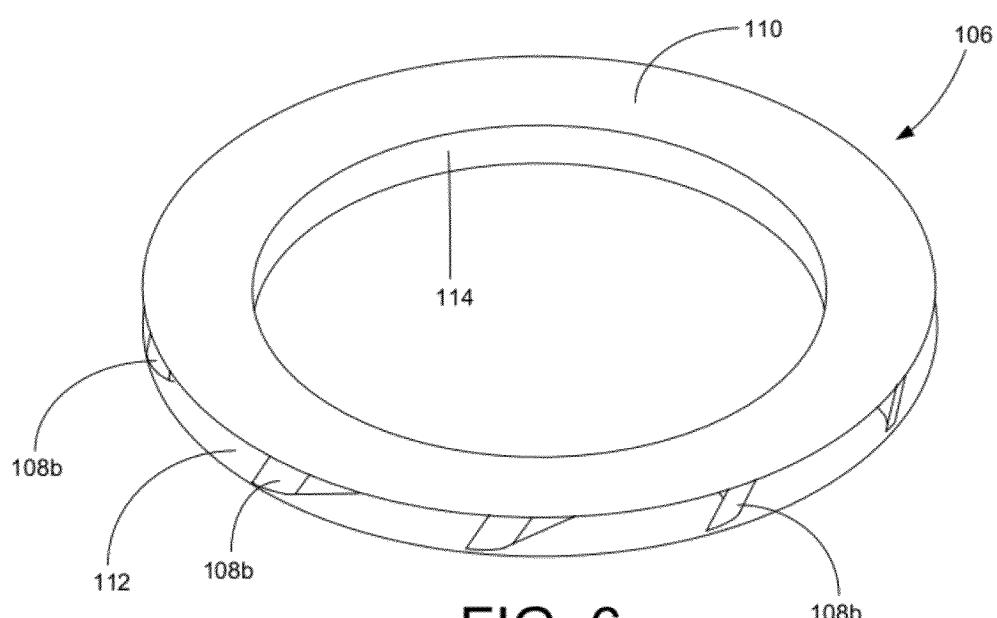
FIG. 6 is a perspective view of a turbine assembly constructed in accordance with a third preferred embodiment.
Figure 7:
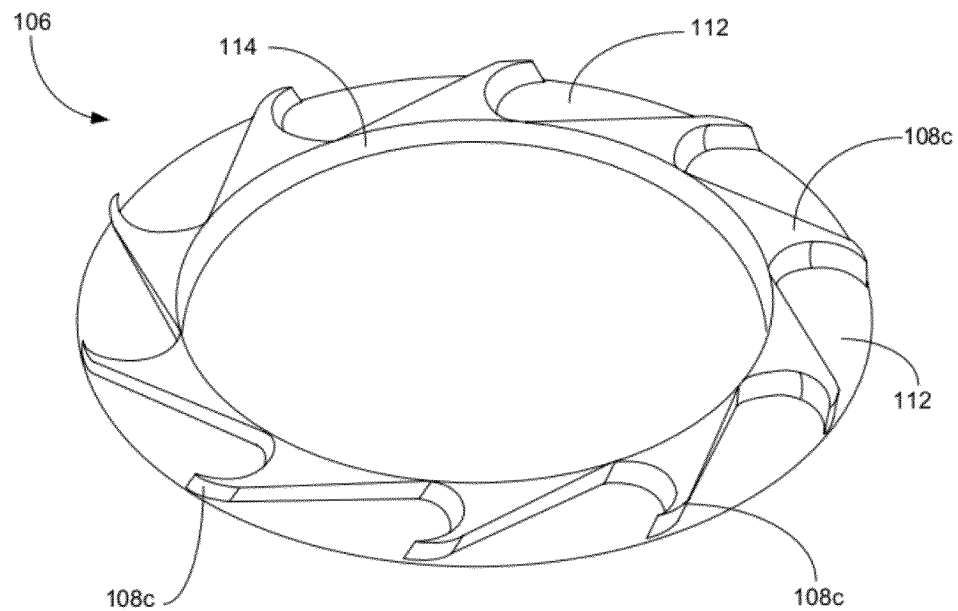
FIG. 7 is a perspective view of a turbine assembly of FIG. 6 with the upper drive ring removed.

Turning to FIGS. 6 and 7, shown therein is a depiction of the radial turbine assembly 106 constructed in accordance with a third preferred embodiment. The upper drive ring 110 has been removed in FIG. 7 to better illustrate the design of the vanes 108b. In the third preferred embodiment illustrated in FIGS. 6 and 7, each vane 108b resembles the drag-based vanes 108a, except that the vanes 108b have been swept back to introduce secondary flows. The swept form of the vanes 108b creates less drag on the opposing side of the radial turbine assembly 106, thus increasing the differential drag of the radial turbine assembly 106. The increased differential drag generally improves the efficiency of the radial turbine assembly 106.

Figure 8:
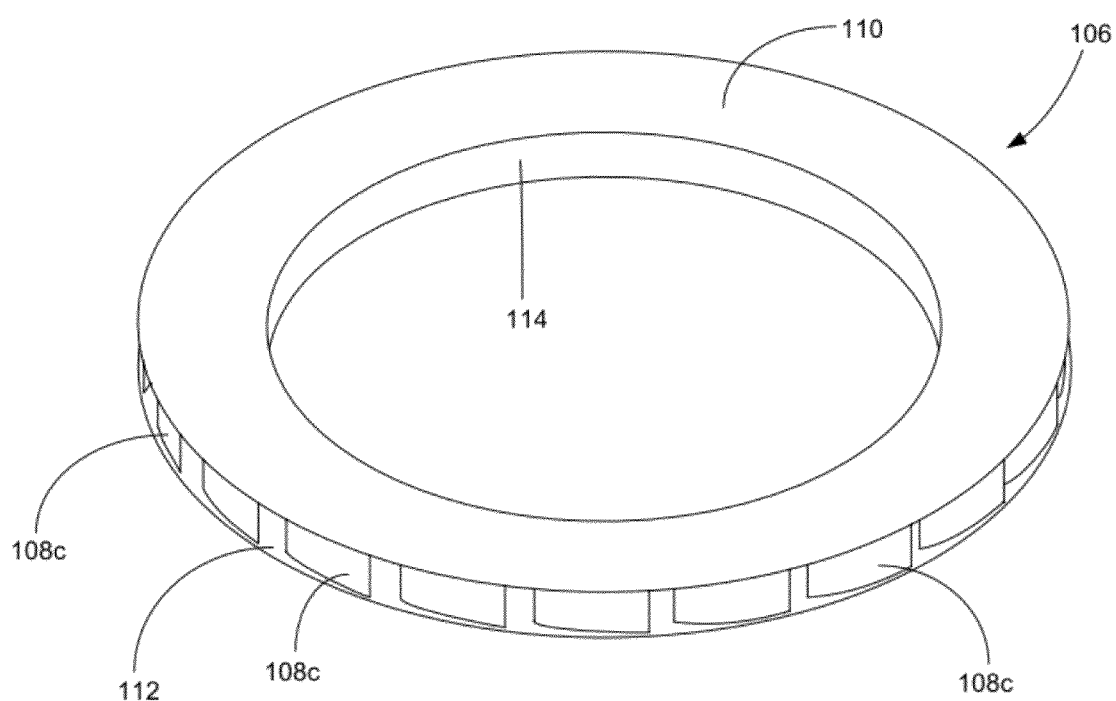
FIG. 8 is a perspective view of a turbine assembly constructed in accordance with a fourth preferred embodiment.

Turning to FIG. 8, shown therein is a depiction of the radial turbine assembly 106 constructed in accordance with a fourth preferred embodiment. In the fourth preferred embodiment illustrated in FIG. 8, each vane 108c is configured as an independent airfoil that resembles a lift-based vertical axis turbine similar to a Daerrieus wind turbine. In the fourth preferred embodiment, each vane 108c was configured as a symmetric National Advisory Committee for Aeronautics (NACA) 0012 airfoil. Unlike the first and third preferred embodiments that include vanes 108 that operate on drag principles, the fourth preferred embodiment depicted in FIG. 8 operates by creating lift through a differential pressure exerted across each airfoil vane 108c.

In addition to the various vane designs depicted in FIGS. 1-8, it will be appreciated that other vane designs will fall within the scope of preferred embodiments. Additionally, it may be desirable to employ a variety of vane designs in a single radial turbine assembly 106. For example, it may be desirable to provide lift-based and drag-based vanes 108 in a single radial turbine assembly 106. Furthermore, if the building 100 includes multiple radial turbine assemblies 106, each radial turbine assembly 106 may include vanes 108 with designs that are unique to that radial turbine assembly 106.

Figure 9:
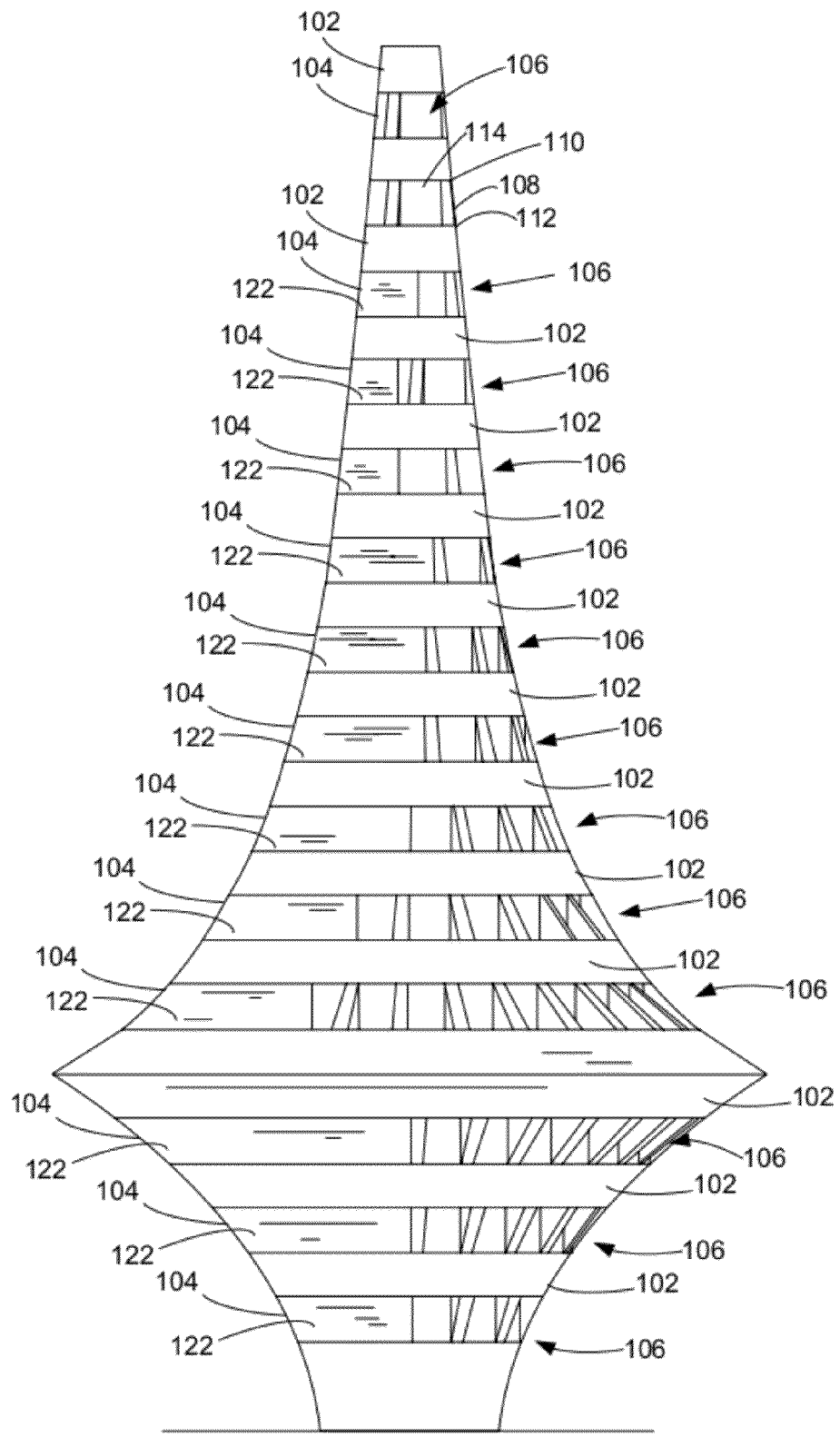
FIG. 9 is an elevational view of the building of FIG. 1 with wind screens covering portions of some of the turbine assemblies.
Figure 10:
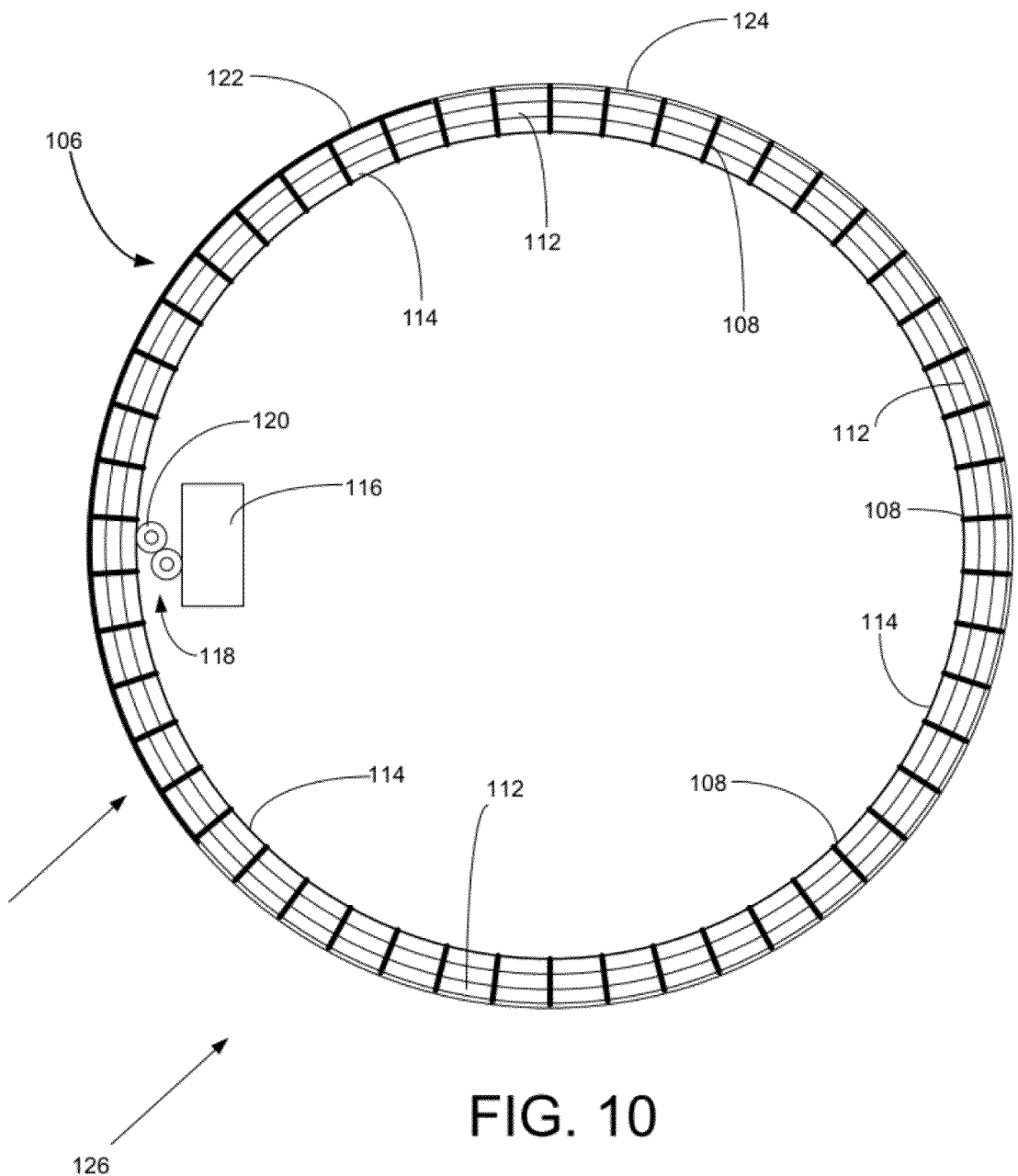
FIG. 10 is a top view of a turbine, transmission and generator from the building of FIG. 9.

Turning to FIG. 9, shown therein is an elevational view of the building 100 that includes a plurality of radial turbine assemblies 106 that incorporate wind screens 122. FIG. 10 provides a top diagrammatic depiction of a single radial turbine assembly 106 that includes the wind screen 122. As illustrated in FIGS. 9 and 10, the wind screen 122 is mounted on a track 124 and extends around a portion of the outer circumference of the radial turbine assembly 106. The wind screen 122 is configured for motorized rotation around the outer circumference of the radial turbine assembly 106 on the track 124 to selectively cover a series of adjacent vanes 108 in response to a wind 126.

To prevent the radial turbine assembly 106 from stalling, the vanes 108 are covered by the wind screen 122 on a portion of the windward side of the building 100. Covering a portion of the vanes 108 enhances the rotation of the radial turbine assembly 106. If the radial turbine assembly 106 includes vanes 108 that permit rotation in both directions, the wind screen 122 can also be used to control the direction of rotation. In the preferred embodiment depicted in FIGS. 9 and 10, the wind screens 122 are configured to cover about one-third to one-half of the vanes 108 in each radial turbine assembly 106. In a particularly preferred embodiment, the wind screen 122 is configured to cover one-half of the circumference of the radial turbine assembly 106. The movement of the wind screen 122 is preferably automatically controlled in response to real-time weather information obtained from sensors located on or near the building 100.

It may be desirable to configure individual radial turbine assemblies 106 so that they rotate in different directions to offset the resultant forces generated by the rotation of the radial turbine assemblies 106. For some radial turbine assemblies 106, the direction of rotation of each radial turbine assembly 106 can be controlled by selectively positioning the wind screen 122. It will be understood, however, that certain vane 108 designs promote or limit the rotation of the radial turbine assembly 106 in a single direction. When such vanes 108 are employed, it may not be necessary to use the wind screen 122 to control the rotational direction of particular radial turbine assemblies 106. For those directional vanes 108, the direction of rotation of the radial turbine assembly 106 can be controlled by selectively installing the vanes 108 in a selected orientation. By installing the vanes 108 in a first orientation, the radial turbine assembly 106 can be caused to rotate in a first direction. Installing the vanes on an adjacent radial turbine assembly 106 in a second orientation will cause the adjacent radial turbine assembly 106 to rotate in a second direction in response to the same wind. Even if a particular radial turbine assembly 106 includes direction specific vanes 108, the use of the wind screens 122 may be advisable to enhance the performance of the radial turbine assembly 106 irrespective of the need to control the rotational direction.

The feasibility of preferred embodiments of the present invention was evaluated at the College of Engineering, Architecture and Technology at Oklahoma State University in Stillwater, Okla. Using the Oklahoma State University subsonic wind tunnel facility, three independent test models were constructed to analyze and visualize flow around scale models of the building 100. A variety of radial turbine assembly 106 designs were evaluated. Tests confirmed that the number of vanes 108 and the design of the vanes 108 can significantly impact the performance of the radial turbine assembly 106. Tests also indicated that the use of the optional wind screen 122 significantly improved the performance of the radial turbine assembly 106 under certain circumstances.

In all wind turbines, the amount of power available is proportional to the cross-sectional area of rotors. The amount of power available is proportional to the velocity cubed, thus doubling the wind velocity makes increases the resulting power by a factor of eight. As wind velocity increases, however, rotor tip speed also increases, which is the common limiting factor in conventional designs. Using established power calculations, estimates for a full-scale building 100 with 44 floors 102 with 43 radial turbine assemblies 106 indicate that the building 100 could generate 10% of the building's power requirement in a 13 mph wind and 100% of the building's power requirement in a 28 mph wind. These calculations were determined to be conservative based on upon the wind tunnel measurements.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the description, claims and drawings are expressed. It will be appreciated by those skilled in the art that the teachings of the present invention can be applied to other systems without departing from the scope and spirit of the appended claims.

It is claimed:

1. A building with an integrated wind-powered electricity generation system, wherein the building includes:
 a first floor;
 a second floor;
 a plenum space between the first floor and the second floor; and
 a radial turbine assembly positioned within the plenum space, wherein the radial turbine assembly is configured to rotate about a vertical axis; and
 wherein the radial turbine assembly includes:
  a hub;
  an upper drive ring connected to the hub;
  a lower drive ring connected to the hub; and
  a plurality of vanes supported between the upper drive ring and lower drive ring.

2. The building of claim 1, wherein the radial turbine assembly rotates about a vertical axis extending through the center of the building.

3. The building of claim 1, wherein at least a portion of the plurality of vanes are configured as drag-based vanes with a substantially circular section.

4. The building of claim 1, wherein at least a portion of the plurality of vanes are configured as lift-based vanes.

5. The building of claim 1, wherein a first portion of the plurality of vanes are configured as drag-based vanes and a second portion of the plurality of vanes are configured as lift-based vanes.

6. The building of claim 1 further comprising an electricity generator disposed within the hub of the radial turbine assembly.

7. The building of claim 6, wherein the electricity generator is coupled to the hub of the radial turbine assembly with a transmission.

8. The building of claim 1, wherein the radial turbine assembly further comprises a wind screen extending around the outside of a portion of the radial turbine assembly, wherein the wind screen is selectively rotatable around the radial turbine assembly to cover a series of adjacent vanes to control the direction of rotation of the radial turbine assembly.

9. The building of claim 8, wherein the radial turbine assembly includes a track and wherein the wind screen can be selectively rotated around the radial turbine assembly on the track.

10. The building of claim 9, wherein the wind screen covers about one-half of the outer circumference of the radial turbine assembly.

11. The building of claim 1, wherein the building comprises a circular cross-section that varies in diameter across the height of the building.

12. The building of claim 11, wherein the geometry of the building approximates two parabolas in vertical section revolved around a central axis to form curved cones at open ends.

13. A building comprising:
 a floor;
 a plenum space adjacent the floor;
 a vertical axis wind turbine located in the plenum space, wherein the vertical axis wind turbine includes a wind screen extending around the outside of a portion of the vertical axis wind turbine, wherein the wind screen is selectively rotatable around the vertical axis wind turbine to cover a series of adjacent vanes to control the direction of rotation of the vertical axis wind turbine.

14. The building of claim 13, wherein the vertical axis wind turbine rotates about a vertical axis extending through the center of the building.

15. The building of claim 13, wherein the vertical axis wind turbine comprises:
a hub;
an upper drive ring connected to the hub;
a lower drive ring connected to the hub; and
a plurality of vanes connected to the upper drive ring and the lower drive ring.

16. The building of claim 15, wherein at least a portion of the plurality of vanes are configured as drag-based vanes with a substantially circular section.

17. A building with an integrated wind-powered electricity generation system, wherein the building includes:
a plurality of floors, wherein each of the plurality of floors includes inhabitable space;
a plenum space between adjacent ones of the plurality of floors;
a plurality of vertical axis wind turbines, wherein each of the plurality of vertical axis wind turbines is positioned within a separate plenum space and wherein at least one of the vertical axis wind turbines includes a wind screen extending around a portion of the outer circumference of the vertical axis wind turbine, wherein a first portion of the plurality of vertical axis wind turbines are configured to rotate in a first direction and a second portion of the plurality of vertical axis wind turbines are configured to rotate in a second direction; and
an electricity generator operably coupled to the vertical axis wind turbine.

18. The building of claim 17, wherein each of the first portion of the plurality of vertical axis turbines includes a wind screen and the direction of rotation of the first portion of the plurality of vertical axis wind turbines is controlled by selectively positioning the wind screens.

19. The building of claim 17, wherein the direction of rotation of the first portion of the plurality of vertical axis wind turbines is controlled by selectively installing the vanes in a first orientation and wherein the direction of rotation of the second portion of the plurality of vertical axis wind turbines is controlled by selectively installing the vanes in a second orientation.

20. The building of claim 17, wherein the building comprises a circular cross-section that varies in diameter across the height of the building.

21. The building of claim 20, wherein the geometry of the building approximates two parabolas in vertical section revolved around a central axis to form curved cones at open ends.

* * * * *